3,016,187
DRIVE MECHANISM FOR RECIPROCATING NUMERICAL VALUE TRANSFER MEMBERS OF CALCULATING OFFICE MACHINES
Gustav Schenk, Wallisellen, Switzerland, assignor to Machine Tool Works Oerlikon, Administration Company, Zurich-Oerlikon, Switzerland, a company of Switzerland
Filed Feb. 19, 1959, Ser. No. 794,438
Claims priority, application Switzerland Feb. 26, 1958
2 Claims. (Cl. 235—60)

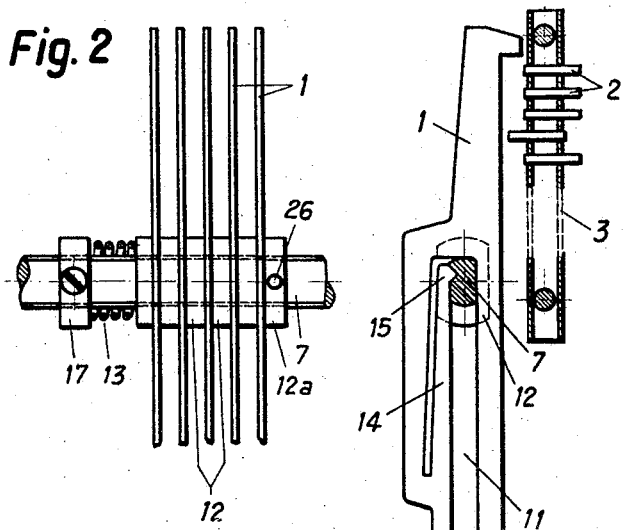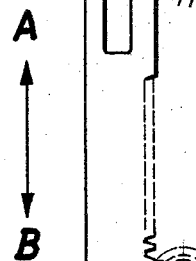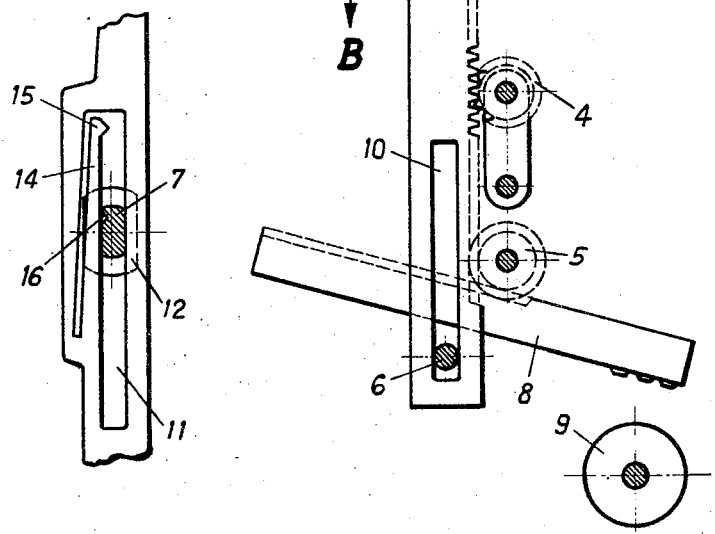
Jan. 9, 1962 — G. SCHENK — 3,016,187
DRIVE MECHANISM FOR RECIPROCATING NUMERICAL VALUE TRANSFER MEMBERS OF CALCULATING OFFICE MACHINES
Filed Feb. 19, 1959
Gustav SCHENK
INVENTOR
By: Wenderoth, Lind & Ponack
Attys ial valUnited States Patent Office 3,016,187
Patented Jan. 9, 1962

The present invention relates to a drive mechanism for the reciprocating members transferring numerical values in calculating office machines, wherein the movement of a common driving member is transmitted by frictional force to the numerical value transfer members.

Such drive mechanisms have already become known. Their toothed racks or toothed segments serving as the numerical value transfer members are displaced from a rest position by a common driving member, a so-called common rail or common bar, and are moved against stops which correspond to the numerical values adjusted for the calculation. By returning the common bar, the toothed racks are subsequently restored to their rest position. The friction drive, which in these known devices replaces the springs otherwise generally used in such drives, consists of friction plates arranged freely slidable on the common bar between the individual toothed racks and pressed against them by a common spring, which may be likewise arranged on the common bar, if desired.

Friction drives have also become known, in which each toothed rack is provided with a separate spring acting on two friction plates arranged on both sides of the toothed rack.

These known friction drives have the disadvantage of a varying friction force, which inter alia is affected for example by the state of lubrication between the friction plates and the toothed racks. For this reason they could not find general adoption in the construction of calculating office machines.

The present invention has the general object of overcoming the aforesaid disadvantages.

It is another object of the invention to keep the application pressure of the friction members to the numerical value transfer members low and thereby to reduce the power consumption of the machine as a whole and to reduce also the wear of the components in frictional contact with one another.

With these and other objects in view which will become apparent from the following description of a preferred embodiment given by way of example, I provide a drive mechanism for the reciprocating numerical value transfer members of calculating office machines, comprising in combination: movable numerical value transfer members, a common driving member in lost motion relation with all of the said transfer members, friction members transmitting movements of the said common driving member by friction forces to the said transfer members, and resilient detent members disengageably transmitting additional forces from the said driving member to the said transfer members.

Preferably I provide a common driving bar passing transversely through elongated slots of the said transfer members, friction plates slidably arranged on the said driving bar between the said transfer members, spring means biasing the said transfer members and friction plates into frictional contact with one another so as to transmit friction forces from the said driving bar to the said transfer members over the whole length of stroke of the said driving bar, adjustable stops limiting the length of stroke of the said transfer members, and resilient detent members transmitting additional driving forces from the said driving bar to the said transfer members, and disengaging themselves upon the said transfer members abutting the said stops.

The said numerical value transfer members are usually made as stampings, and preferably the said resilient detent members are made integral therewith.

The accompanying drawing shows an embodiment of the invention by way of example, only those components being illustrated which are essential for the understanding of the invention. In the drawing:

FIG. 1 is a side elevation, and
FIG. 2 is a plan view of the drive mechanism, while
FIG. 3 shows the detent device in a disengaged condition.

The calculating machine has toothed racks 1 arranged parallel to one another as the numerical value transfer members, the number of which corresponds to the number of places of the machine, and which are movable in the direction of the arrows A—B. The rear guide bar 6 for the toothed racks 1 is fixedly mounted in the walls of the machine frame (not shown). The forward guide bar 7, the common rail, serves as a common driving member, and is movable in the direction of movement of the toothed racks. The movement can be effected by manual or motor drive.

On the two guide bars 6 and 7 the toothed racks 1 are guided by means of longitudinal slots 10 and 11. The movement of the toothed racks 1 is limited by the adjustment pins 2 of a laterally movable adjustment pin carriage 3, which pins can be adjusted by means of the usual figure keys (not shown). The calculating mechanism 4 can be brought into mesh with the toothed racks for receiving from them the numerical values adjusted to and for imparting to them the values calculated. Moreover the movement of the toothed racks 1 is transmitted through intermediate gears 5 to the type bars 8, so that the numerical values of the calculation can be printed on the paper platen 9.

On the common rail 7, which passes transversely through the forward slots 11 of the toothed racks 1, friction plates 12 are loosely fitted between the individual toothed racks. Only the extreme friction plate 12a is fixedly connected to the common rail 7, for example by a pin 26. The friction plates are pressed by a spring 13 against the faces on both sides of the toothed racks 1, and generate friction there which produces a longitudinal force when moving the common rail 7 in the direction of the arrows A—B. The spring 13 abuts a collar 17, which is adjustable in the axial direction of the common rail 7, whereby the application force of the spring can be varied.

For assisting the friction force, detent members 14 designed as resilient tongues are provided on the toothed racks 1 which engage with their forward noses 15 into a notch 16 of the common rail 7. When one of the toothed racks while being moved in the direction B abuts an adjustment pin 2, the toothed rack 1 cannot follow any further movement of the common bar 7, so that the resilient tongue 14 is forced out of the notch 16, with a certain consumption of force. Subsequently only the transmission force of the friction plates 12 acts on the toothed racks 1. While this transmission force applied by the friction plates 12 to the toothed racks 1 is constant over the whole working stroke, the transmission force of the resilient tongues ceases after the stoppage of the toothed racks 1 when abutting the adjustment pins 2 (FIG. 3).

This arrangement assures on the one hand that the toothed racks are safely carried along by the common rail up to their actual end positions, and that they overcome the resistances originating from the calculating mechanism, the printing mechanism etc. Since on the other hand during the idling stroke of the common rail i.e. after the disengagement of the resilient tongues 14, only the comparatively small force of the friction plates acts on the toothed racks 1, the total power consumption for driving a machine provided with the device according to the invention is small. Consequently the force-stroke diagram of the device has a characteristic ideal for machines of this type.

Instead of the friction drive in common for all the toothed racks, friction elements may be provided for each toothed rack individually.

The toothed racks are usually made as stampings, and it is a preferred feature of the invention to make the resilient tongues integral with the stampings of the toothed racks.

While I have described herein and illustrated in the accompanying drawings what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. In a driving mechanism for calculating machines and the like the combination comprising a drive shaft of substantially rectangular cross-section having a longitudinal notch therein, a rack having a recess therein for said drive shaft having a straight lateral face extending longitudinally of said rack, a stop face at one end of said recess extending transversely to said lateral face for said drive shaft when in inoperative position, a resilient tongue integral with said rack extending into said recess having a face extending parallel to said lateral face and spaced therefrom forming a guide for said drive shaft and said resilient tongue adjacent said stop face having a detent extending into said recess so as to resiliently and elastically engage said notch when said rack is in inoperative position.

2. In a driving mechanism according to claim 1, wherein said resilient tongue has in direction of said drive shaft the same thickness as the rack, a friction disk displaceably arranged on said drive shaft on each side of said rack, and resilient means for simultaneously pressing said friction disks against said rack in order to damp the movements of said resilient tongue while said drive shaft is displaced out of said inoperative position.

References Cited in the file of this patent

UNITED STATES PATENTS

| | | |
|---|---|---|
| 2,444,570 | Lawrence et al. | July 6, 1948 |
| 2,515,692 | Boyden et al. | July 18, 1950 |
| 2,920,816 | Greenhow | Jan. 12, 1960 |

FOREIGN PATENTS

| | | |
|---|---|---|
| 536,897 | Italy | Dec. 12, 1955 |